United States Patent
Kessler et al.

(10) Patent No.: US 6,715,057 B1
(45) Date of Patent: Mar. 30, 2004

(54) EFFICIENT TRANSLATION LOOKASIDE BUFFER MISS PROCESSING IN COMPUTER SYSTEMS WITH A LARGE RANGE OF PAGE SIZES

(75) Inventors: Richard E. Kessler, Shrewsbury, MA (US); Jeffrey G. Wiedemeier, Berlin, MA (US); Eileen J. Samberg, Southborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 09/652,552

(22) Filed: Aug. 31, 2000

(51) Int. Cl.[7] .............................................. G06F 12/10
(52) U.S. Cl. ..................................................... 711/207
(58) Field of Search ............................... 711/1, 6, 202, 711/203, 206–209, 212, 220–221

(56) References Cited

U.S. PATENT DOCUMENTS

| | | |
|---|---|---|
| 5,261,066 A | 11/1993 | Jouppi et al. |
| 5,317,718 A | 5/1994 | Jouppi |
| 5,465,337 A * | 11/1995 | Kong .......................... 711/206 |
| 5,617,554 A * | 4/1997 | Alpert et al. ................ 711/208 |
| 5,758,183 A | 5/1998 | Scales |
| 5,761,729 A | 6/1998 | Scales |
| 5,787,480 A | 7/1998 | Scales et al. |
| 5,802,585 A | 9/1998 | Scales et al. |
| 5,809,450 A | 9/1998 | Chrysos et al. |
| 5,854,913 A * | 12/1998 | Goetz et al. ................. 712/210 |
| 5,875,151 A | 2/1999 | Mick |
| 5,890,201 A | 3/1999 | McLellan et al. |
| 5,893,931 A | 4/1999 | Peng et al. |
| 5,918,250 A | 6/1999 | Hammond |
| 5,918,251 A | 6/1999 | Yamada et al. |
| 5,923,872 A | 7/1999 | Chrysos et al. |
| 5,950,228 A | 9/1999 | Scales et al. |
| 5,964,867 A | 10/1999 | Anderson et al. |
| 5,983,325 A | 11/1999 | Lewchuk |
| 6,000,044 A | 12/1999 | Chrysos et al. |
| 6,012,132 A * | 1/2000 | Yamada et al. .............. 711/202 |
| 6,070,227 A | 5/2000 | Rokicki |
| 6,085,300 A | 7/2000 | Sunaga et al. |

OTHER PUBLICATIONS

*Alpha Architecture Reference Manual*, Third Edition, The Alpha Architecture Committee, 1998 Digital Equipment Corporation (21 p.), in particular pp. 3–1 through 3–15.

(List continued on next page.)

*Primary Examiner*—Matthew Kim
*Assistant Examiner*—Woo H. Choi (57) ABSTRACT

A system and method is disclosed to efficiently translate virtual-to-physical addresses of large size pages of data by eliminating one level of a multilevel page table. A computer system containing a processor includes a translation lookaside buffer ("TLB") in the processor. The processor is connected to a system memory that contains a page table with multiple levels. The page table translates the virtual address of a page of data stored in system memory into the corresponding physical address of the page of data. If the size of the page is above a certain threshold value, then translation of the page using the multilevel page table occurs by eliminating one or more levels of the page table. The threshold value preferably is 512 Megabytes. The multilevel page table is only used for translation of the virtual address of the page of data stored in system memory into the corresponding physical address of the page of data if a lookup of the TLB for the virtual address of the page of data results in a miss. The TLB also contains entries from the final level of the page table (i.e., physical addresses of pages of data) corresponding to a subfield of bits from corresponding virtual addresses of the page of data. Virtual-to-physical address translation using the multilevel page table is not required if the TLB contains the needed physical address of the page of data corresponding to the subfield of bits from the virtual address of the page of data.

8 Claims, 6 Drawing Sheets

OTHER PUBLICATIONS

*A Logic Design Structure For LSI Testability*, E. B. Eichelberger et al., 1977 IEEE (pp. 462–468).

*Direct RDRAM ™256/288–Mbit (512K×16/18×32s)*, Preliminary Information Document DL0060 Version 1.01 (69 p.).

*Testability Features of AMD–K6™Microprocessor*, R. S. Fetherston et al., Advanced Micro Devices (8 p.).

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are You PLDs Metastable?*, Cypress Semiconductor Corporation, Mar. 6, 1997 (19 p.).

*Rambus® RIMM™Module (with 128/144Mb RDRAMs)*, Preliminary Information, Document DL0084 Version 1.1 (12 p.).

*Direct Rambus™RIMM™Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

1662–23700, 09/653,642, Aug. 31, 2000, Apparatus And Method For Interfacing A High Speed Scan–Path With Slow–Speed Test Equipment.

1662–27300, 09/652,322, Aug. 31, 2000, Priority Rules For Reducing Network Message Routing Latency.

1662–27400, 09/652,703, Aug. 31, 2000, Scalable Directory Based Cache Coherence Protocol.

1662–27500, 09/652,391, Aug. 31, 2000, Scalable Efficient I/O Port Protocol.

1662–27700, 09/651,949, Aug. 31, 2000, Fault Containment And Error Recovery Techniques In A Scalable Multiprocessor.

1662–27800, 09/652,834, Aug. 31, 2000, Speculative Directory Writes in A Directory Based Cache Coherent Nonuniform Memory Access Protocol.

1662–27900, 09/652,314, Aug. 31, 2000, Special Encoding Of Known Bad Data.

1662–28000, 09/652,165, Aug. 31, 2000, Broadcast Invalidate Scheme.

1662–28100, 09/652,704, Aug. 31, 2000, Mechanism To Track All Open Pages In A DRAM Memory System.

1662–28200, 09/653,093, Aug. 31, 2000, Programmable DRAM Address Mapping Mechanism.

1662–29200, 09/652,323, Aug. 31, 2000, Computer Architecture And System For Efficient Management Of Bi–Directional Bus.

1662–29300, 09/652,452, Aug. 31, 2000, An Efficient Address Interleaving With Simultaneous Multiple Locality Options.

1662–29400, 09/653,092, Aug. 31, 2000, A High Performance Way Allocation Strategy For A Multi–Way Associative Cache System.

1662–29500, 09/651,948, Aug. 31, 2000, Method And System For Absorbing Defects In High Performance Microprocessor With A Large N–Way Set Associative Cache.

1662–29600, 09/652,324, Aug. 31, 2000, A Method For Reducing Directory Writes And Latency In A High Performance, Directory–Based, Coherency Protocol.

1662–30800, 09/653,094, Aug. 31, 2000, Mechanism To Reorder Memory Read And Write Transactions For Reduced Latency And Increased Bandwidth.

1662–30900, 09/652,325, Aug. 31, 2000, System For Minimizing Memory Bank Conflicts In A Computer System.

1662–31000, 09/651,945, Aug. 31, 2000, Computer Resource Management And Allocation System.

1662–31100, 09/653,643, Aug. 31, 2000, Input Data Recovery Scheme.

1662–31200, 09/652,451, Aug. 31, 2000, Fast Lane Prefetching.

1662–31300, 09/652,480, Aug. 31, 2000, Mechanism For Synchronizing Multiple Skewed Source–Synchronous Data Channels With Automatic Initialization Feature.

1662–31400, 09/651,924, Aug. 31, 2000, Mechanism To Control The Allocation Of An N–Source Shared Buffer.

1662–31500, 09/652,315, Aug. 31, 2000, Chaining Directory Reads And Writes To Reduce DRAM Bandwidth In A Directory Based CC–NUMA Protocol.

* cited by examiner

EFFICIENT TRANSLATION LOOKASIDE BUFFER MISS PROCESSING IN COMPUTER SYSTEMS WITH A LARGE RANGE OF PAGE SIZES

CROSS-REFERENCE TO RELATED APPLICATIONS

This application relates to the following commonly assigned co-pending applications entitled:

"Apparatus And Method For Interfacing A High Speed Scan-Path With Slow-Speed Test Equipment," Ser. No. 09/653,642, filed Aug. 31, 2000, "Priority Rules For Reducing Network Message Routing Latency," Ser. No. 09/652,322, filed Aug. 31, 2000, "Scalable Directory Based Cache Coherence Protocol," Ser. No. 09/652,703, filed Aug. 31, 2000, "Scalable Efficient I/O Port Protocol," Ser. No. 09/652,391, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,165, filed Aug. 31, 2000, "Mechanism To Track All Open Pages In A DRAM Memory System," Ser. No. 09/652,704, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/652,324, filed Aug. 31, 2000, "Mechanism To Reorder Memory Read and Write Transactions For Reduced Latency And Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Computer Resource Management And Allocation System," Ser. No. 09/651,945, filed Aug. 31, 2000, "Input Data Recovery Scheme," Ser. No. 09/653,643, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization Feature," Ser. No. 09/652,480, filed Aug. 31, 2000, "Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a processor that includes a large range of page sizes stored in main memory. More particularly, the invention relates to a computer system with a multi-level page table and translation lookaside buffer ("TLB") that efficiently maps virtual page addresses to physical page addresses for a memory system containing variable sized pages. Still more particularly, the present invention relates to a system that eliminates one level of the page table to efficiently map addresses of large pages in the memory system.

2. Background of the Invention

Almost all computer systems include a processor and a main memory. The main memory functions as the physical working memory of the computer system, where data is stored that has been or will be used by the processor and other system components. In computer systems that implement "virtual memory," software programs executing on the computer system reference main memory through the use of virtual addresses. A memory management unit ("MMU") translates each virtual address specified by a software program instruction to a physical address that is passed to the main memory in order to retrieve the requested data. The use of virtual memory permits the size of programs to greatly exceed the size of the physical main memory and provides flexibility in the placement of programs in the main memory.

Implementing a virtual memory system requires establishing a correspondence between virtual address space and physical address space in the main memory. The most common technique by which to have virtual address space correspond with physical address space is by using a paging system. A paging system involves separately dividing virtual address space and its corresponding physical address space into contiguous blocks called pages. Each page has a virtual page number ("VPN") address in virtual address space that corresponds to the physical page number ("PPN") address of the page in physical address space.

For each access to main memory, a virtual page number address in virtual address space is translated into the corresponding physical page number address in physical address space and a page offset within the physical page is appended to the physical page number address. Thus, the virtual address subdivided into a Virtual Page Number Address:Page Offset is translated into a physical address consisting of Physical Page Number Address:Page Offset. The physical address is then used to access main memory. Translation of the virtual page number address into its corresponding physical page number address occurs through the use of page tables stored in physical main memory.

In order to reduce the total number of page table main memory accesses required per virtual-to-physical address translation, one or more translation-lookaside buffers are often provided in the MMU. TLB accesses reduce the overall average time required to perform the steps of a virtual-to-physical address translation. A TLB is a cache-like memory, typically implemented in Static Random Access Memory ("SRAM") and/or Content Addressable Memory ("CAM"), that holds virtual page number address to physical page number address translations that have recently been fetched from the page table in physical main memory.

Access to a TLB entry holding an output physical page number address corresponding to an input virtual page number address obviates the need for and is typically many orders of magnitude faster than access to the page table in main memory.

If the TLB does not contain the requested translation (i.e., a TLB "miss" occurs) then the MMU initiates a search of page tables stored in main memory for the requested virtual page number address. TLB miss handler software executing on the MMU then loads the physical page number address referenced by the virtual page number address into the TLB, where it may be available for subsequent fast access should translation for the same input virtual page number address be required at some future point.

Modem day computer systems implement large virtual address spaces requiring many virtual address bits. A simple page table array with one entry for each possible input virtual page number address, as commonly used in the prior art, is not a feasible solution for implementing the page table because of the slow translation times for such large input addresses and the enormous size of the page table array. To keep page tables required for address translation to a reasonable size and reduce translation times, some virtual to physical address translation schemes implement address translation in multiple stages. In a typical implementation, each stage of the virtual-to-physical address translation requires one or more accesses to the page table that is held in physical main memory. Each stage of the translation requires accessing a different level of the page table using a subfield of bits from the virtual address. Thus, for a virtual memory system that incorporates three stage address translation, the page table may be broken up into three levels with the virtual page number address field from the virtual address being divided into three subfields of bits. One advantage of multistage address translation is the reduction of the amount of main memory needed to store the page tables. The reduction of main memory needed to store the page tables comes from the ability to sparsely populate the page tables and the ability to page out parts of the page table.

The final stage of address translation implemented by the bottom level of the page table (e.g., three level system this would be the third level) prior to generating the physical page number address may be virtually mapped to provide quick access to the page table entries on a TLB miss. Prior to walking each level of the page table to generate the physical page number address, a page table lookup of the virtually mapped bottom level page table entry would occur. The virtually mapped page table lookup to the TLB may also result in a miss, thus resulting in a double translation lookaside buffer miss (virtual page number address TLB miss and virtually mapped final level of the page table TLB miss). Such double TLB misses are slow since a complete walk of the page table structure is then required. Thus, for the three level page table example, a double translation lookaside buffer miss would result in the physical page number address being generated by sequential multiple accesses to each of the three levels of the page table.

One solution to reduce translation lookaside buffer misses is to use larger page sizes so that the same physical main memory can be described by many fewer virtual page number addresses. TLB misses for a system with large page sizes are much less likely. For example, if the small page sizes are such that physical main memory can be mapped into a total of 16 pages while the TLB can only hold eight virtual-to-physical page translations, on the average a random TLB access will miss 50% of the time. Alternatively, if the virtual memory system is implemented with large page sizes such that physical main memory can be mapped into a total of eight pages while the TLB can hold eight virtual-to-physical page translations, an access to the TLB will never miss. However, large page sizes also result in more expensive and complex hardware to access the page offset within the physical page and increase unused fields within the pages (due to internal fragmentation). For this reason, high-performance processors generally allow any of a plurality of page sizes to be selected for different purposes.

High performance processors implementing a virtual memory system that allow multiple page sizes regardless of the page size use the same strategy for all page sizes to translate the virtual page number address into the physical page number address. In such systems, accesses to large size pages using the same translation mapping as small size pages may result in a TLB miss for the virtually mapped final level page table and for every virtual page number address TLB miss (a double TLB miss). This is because the page table is structured for small pages and the page table entries for large page sizes may be duplicated many times. Thus, using the same virtual-to-physical translation scheme for different size pages in a multiple page size virtual memory system may effectively waste half the entries in the TLB (one physical page number address entry corresponds to a virtual page number address and the same physical page number address entry corresponds to a subfield of bits in the virtual page number address) because with large page sizes a double TLB miss is more likely. The second unneeded access to the TLB would further reduce memory system performance and increase average memory access time for data. Finally, modern day virtual memory systems typically include a data cache that contains the data for the most recently translated virtual-to-physical page number addresses. A virtual memory system that supports multiple page sizes but structures the page table for small pages, thus containing duplicate entries for large page sizes, would include in the data cache duplicate copies of the data for each of the large size page entries. A virtual address translation resulting in a double miss to the TLB would also likely result in a miss to the data cache because of the unnecessary duplication of pages.

It would be advantageous if a virtual memory system could perform virtual-to-physical address translation using a multilevel page table that effectively eliminates the problems and disadvantages described above. The address translation scheme must be able to differentiate large page sizes from small page sizes and treat the virtual-to-physical translation of each type of page separately. Separate translation would avoid the duplication of large pages and allow the TLB to map much larger amounts of physical main memory. Despite the apparent performance advantages of such a virtual memory system, to date no such system has been implemented.

BRIEF SUMMARY OF THE INVENTION

The problems noted above are solved in large part by a computer system that includes a processor containing a translation lookaside buffer. The processor is connected to a system memory that contains a page table with multiple levels. The page table translates the virtual address of a page of data stored in system memory into the corresponding physical address of the page of data. If the size of the page is above a certain threshold value, then translation of the page using the multilevel page table occurs by eliminating one or more levels of the page table. In the preferred embodiment, the threshold value is 512 Megabytes. The multilevel page table is only used for translation of the virtual address of the page of data stored in system memory into the corresponding physical address of the page of data if a lookup of the translation lookaside buffer for the virtual address of the page of data results in a miss. The translation lookaside buffer also contains entries from the final level of the page table (i.e., physical addresses of pages of data) that correspond to a subfield of bits from the corresponding virtual addresses of the page of data. Virtual-to-physical address translation using the multilevel page table is not required if the translation lookaside buffer contains the needed physical address of the page of data corresponding to the subfield of bits from the virtual address of the page of data.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
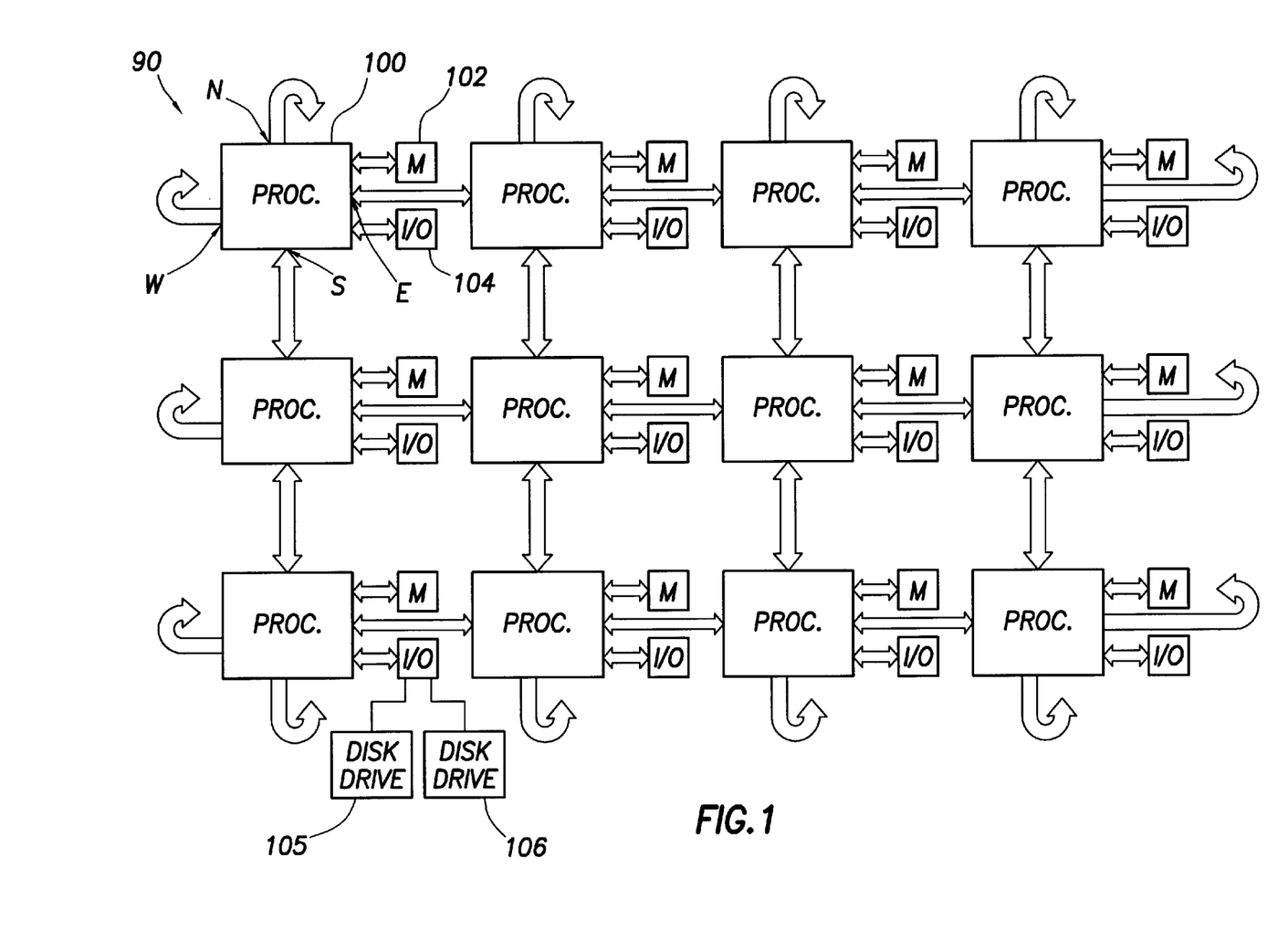
FIG. 1 shows a system diagram of a plurality of processors coupled together.

Referring now to FIG. 1, in accordance with the preferred embodiment of the invention, computer system 90 constructed in accordance with the preferred embodiment comprises one or more processors 100 coupled to a memory 102 and an input/output ("I/O") controller 104. As shown in FIG. 1, computer system 90 includes 12 processors 100, each processor coupled to a memory and an I/O controller. Although the computer system 90 is shown as a multiple processor system in FIG. 1, it should be understood that the present invention also may be implemented on a single processor system, and thus the following disclosure is intended to be illustrative of the preferred embodiment of practicing the invention, and is not intended to imply that the invention is limited to use in a multi-processor system.

According to the preferred embodiment, each processor preferably includes four ports for connection to adjacent processors. The inter-processor ports are designated "north," "south," "east," and "west" in accordance with the well-known Manhattan grid architecture. As such, each processor 100 can be connected to four other processors. The processors on both end of the system layout wrap around and connect to processors on the opposite side to implement a 2D torus-type connection. Although twelve processors 100 are shown in the exemplary embodiment of FIG. 1, any desired number of processors (e.g., 256) can be included. In the preferred embodiment, computer system 90 is designed to accommodate either 256 processors or 128 processors, depending on the size of the memory associated with the processors.

The I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMbus™ memory devices, but other types of memory devices can be used if desired. The capacity of the memory devices 102 can be any suitable size. Further, memory devices 102 preferably are implemented as Rambus Interface Memory Modules ("RIMMs").

In general, computer system 90 can be configured so that any processor 100 can access its own memory 102 and I/O devices as well as the memory and I/O devices of all other processors in the network. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Figure 2A:
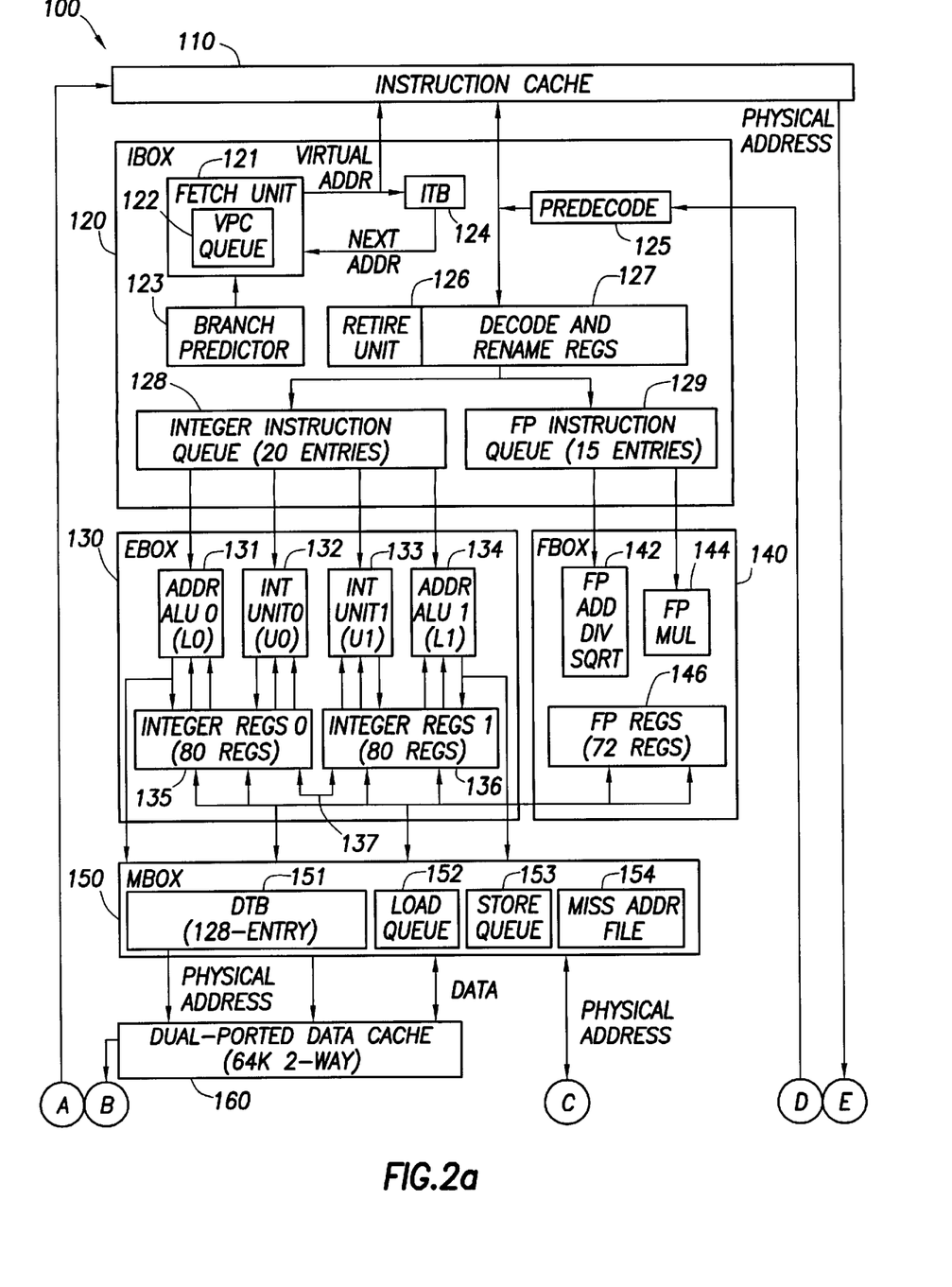
FIGS. 2a and 2b show a block diagram of the processors of FIG. 1.
Figure 2B:
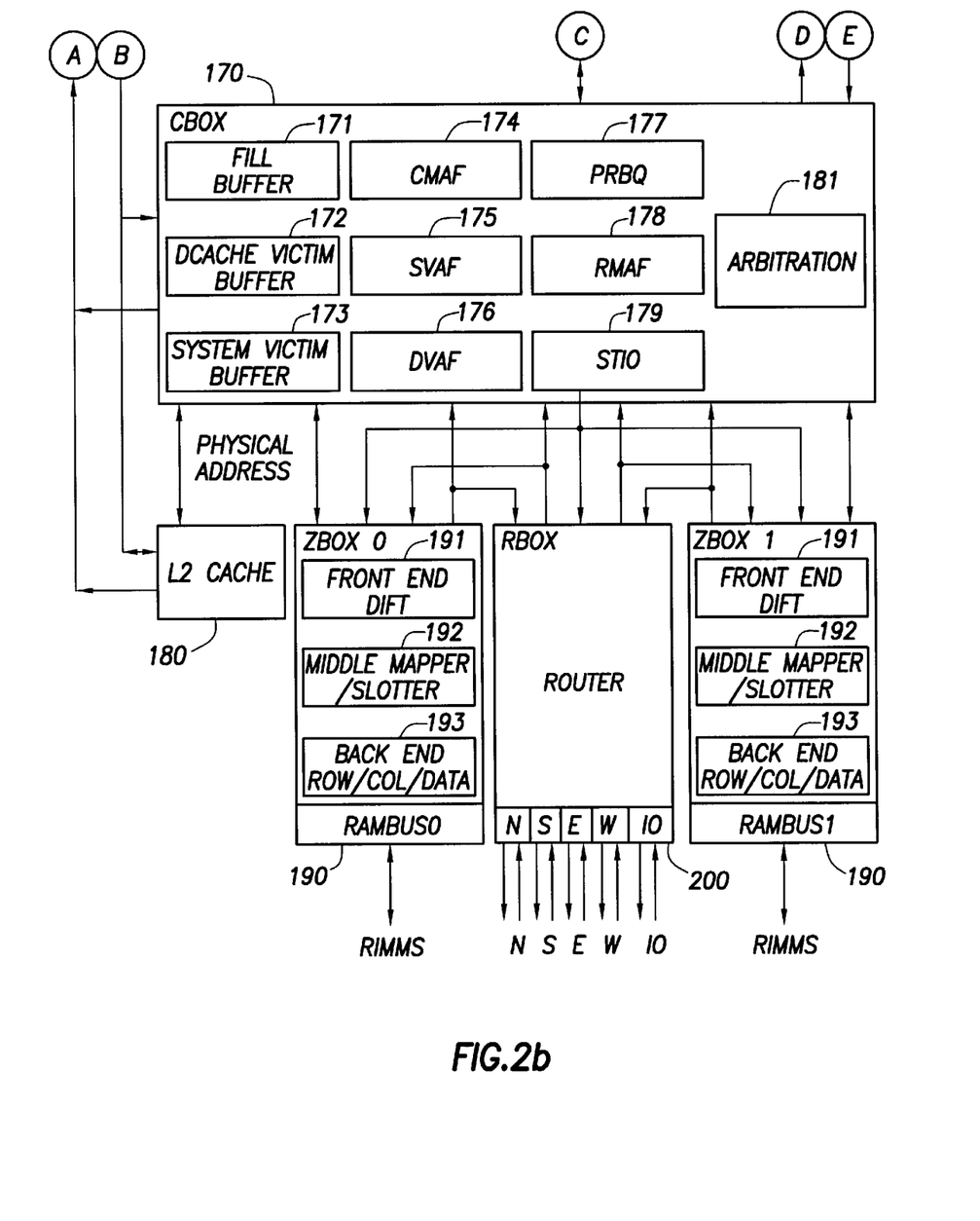

Referring now to FIGS. 2a and 2b, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicate with various other functional units control logic as shown. The instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

The Ibox 120 with regard to branch instructions uses the branch predictor 123. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 123 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The instruction translation buffer ("ITB") 124 couples to the instruction cache 110 and the fetch unit 121. The ITB 124 comprises a 128-entry, fully associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, internal processor registers. The retire unit 126 of the preferred embodiment can retire instructions at a sustained rate of eight instructions per cycle, and can retire as many as 11 instructions in a single cycle.

The decode and rename registers 127 contain logic that forwards instructions to the integer and floating-point instruction queues 128, 129. The decode and rename registers 127 perform preferably the following two functions. First, the decode and rename registers 127 eliminate register write-after-read ("WAR") and write-after-write ("WAW") data dependency while preserving true read-after-write ("RAW") data dependencies. This permits instructions to be dynamically rescheduled. Second, the decode and rename registers 127 permit the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit ("Fbox") registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It contains 32 entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It contains 32 entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor.

The MAF 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and single secondary-level, unified instruction/data ("L2") cache 180 (FIG. 2b). The L1 instruction cache 110 preferably is a 64-KB virtual-addressed, two-way set-associative cache. Prediction is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably is a 64-KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32 KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

The L2 cache 180 preferably is a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 preferably in the Cbox is used to buffer data that comes from other functional units outside the Cbox. The data and instructions get written into the fill buffer and other logic units in the Cbox process the data and instructions before sending to another functional unit or the L1 cache. The data cache victim buffer ("VDF") 172 preferably stores data flushed from the L1 cache or sent to the System Victim Data Buffer 173. The System Victim Data Buffer ("SVDB") 173 is used to send data flushed from the L2 cache to other processors in the system and to memory. Cbox Miss-Address File ("CMAF") 174 preferably holds addresses of L1 cache misses. CMAF updates and maintains the status of these addresses. The System Victim-Address File ("SVAF") 175 in the Cbox preferably contains the addresses of all SVDB data entries. Data Victim-Address File ("DVAF") 176 preferably contains the addresses of all data cache victim buffer ("VDF") data entries.

The Probe Queue ("PRBQ") 177 preferably comprises a 18-entry queue that holds pending system port cache probe commands and addresses. This queue includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox preferably accepts requests and responds with data or instructions from the L2 cache. Data accesses from other functional units in the processor, other processors in the computer system or any other devices that might need data out of the L2 cache are sent to the RMAF for service. The Store Input/Output ("STIO") 179 preferably transfer data from the local processor to I/O cards in the computer system. Finally, arbitration unit 181 in the Cbox preferably arbitrates between load and store accesses to the same memory location of the L2 cache and informs other logic blocks in the Cbox and computer system functional units of the conflict.

Referring still to FIG. 2b, processor 100 preferably includes dual, integrated RAMbus memory controllers 190 (Zbox0 and Zbox1). Each Zbox 190 controls 4 or 5 channels of information flow with the main memory 102 (FIG. 1). Each Zbox preferably includes a front-end directory in-flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox, sending response commands to and receiving packets from the Cbox and Rbox, and tracking up to 32 in-flight transactions. The front-end DIFT 191 also sends directory read and write requests to the Zbox and conditionally updates directory information based on request type, Local Probe Response ("LPR") status and directory state.

The middle mapper 192 maps the physical address into RAMbus device format by device, bank, row, and column. The middle mapper 192 also maintains an open-page table to track all open pages and to close pages on demand if bank conflicts arise. The mapper 192 also schedules RAMbus transactions such as timer-base request queues. The Zbox back end 193 preferably packetizes the address, control, and data into RAMbus format and provides the electrical interface to the RAMbus devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Figure 3:
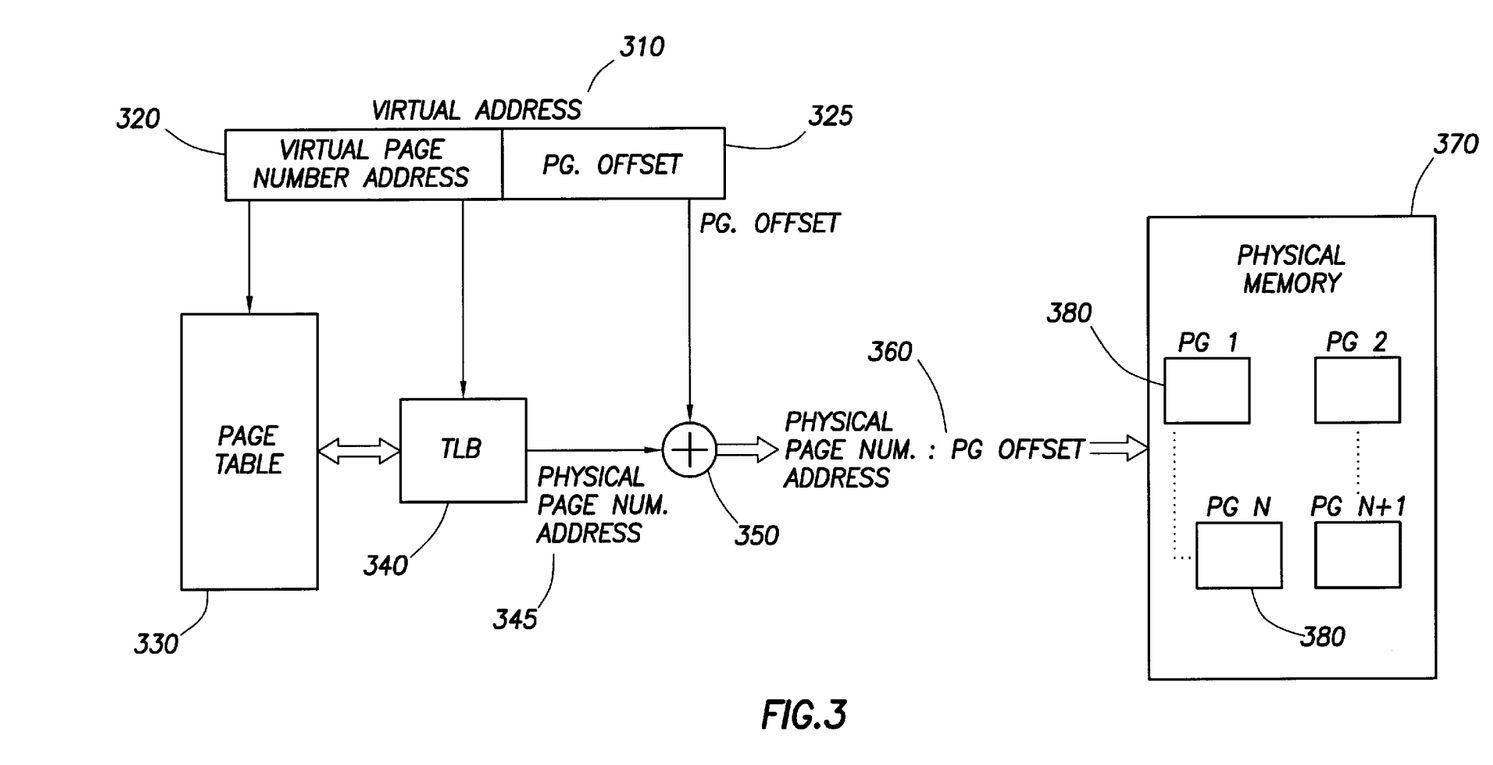
FIG. 3 shows the translation of a virtual address to a physical address using a translation lookaside buffer and page table.

Turning now to FIG. 3, translation of a virtual address to a physical address using a single level page table and translation lookaside buffer is shown for a virtual memory system supporting a single page size. A virtual address 310 can be subdivided into two subfields of bits, virtual page number address field 320 and page-offset field 325. The virtual page number ("VPN") address 320 is used in the translation lookaside buffer 340 to lookup the physical page number ("PPN") address 345. If the TLB 340 contains the particular PPN address 345 corresponding to the VPN address 320 (a TLB "hit"), then the PPN address 345 is retrieved from the TLB 340 and appended with the page offset field 325 in appending circuit 350. If the TLB 340 does not contain the particular PPN address 345 corresponding to the VPN address 320 (a TLB "miss") then a lookup of the page table 330 to determine the PPN address 345 occurs. The page table 330 contains all possible VPN addresses 320 of the virtual memory system. Once the PPN address 345 is determined from the page table 330, the PPN address 345 corresponding to the VPN address 320 is loaded into the TLB 340. TLB 340 is again accessed with the VPN address 320 to generate the recently loaded PPN address 345 at the TLB 340 output. The physical address 360 consisting of the physical page number address:page offset (PPN address:page offset) is then used to access physical main memory 370 of the computer system. The PPN address 345 determines the particular page 380 and the page offset determines the offset within the page 380 that the memory access is to.

Figure 4:
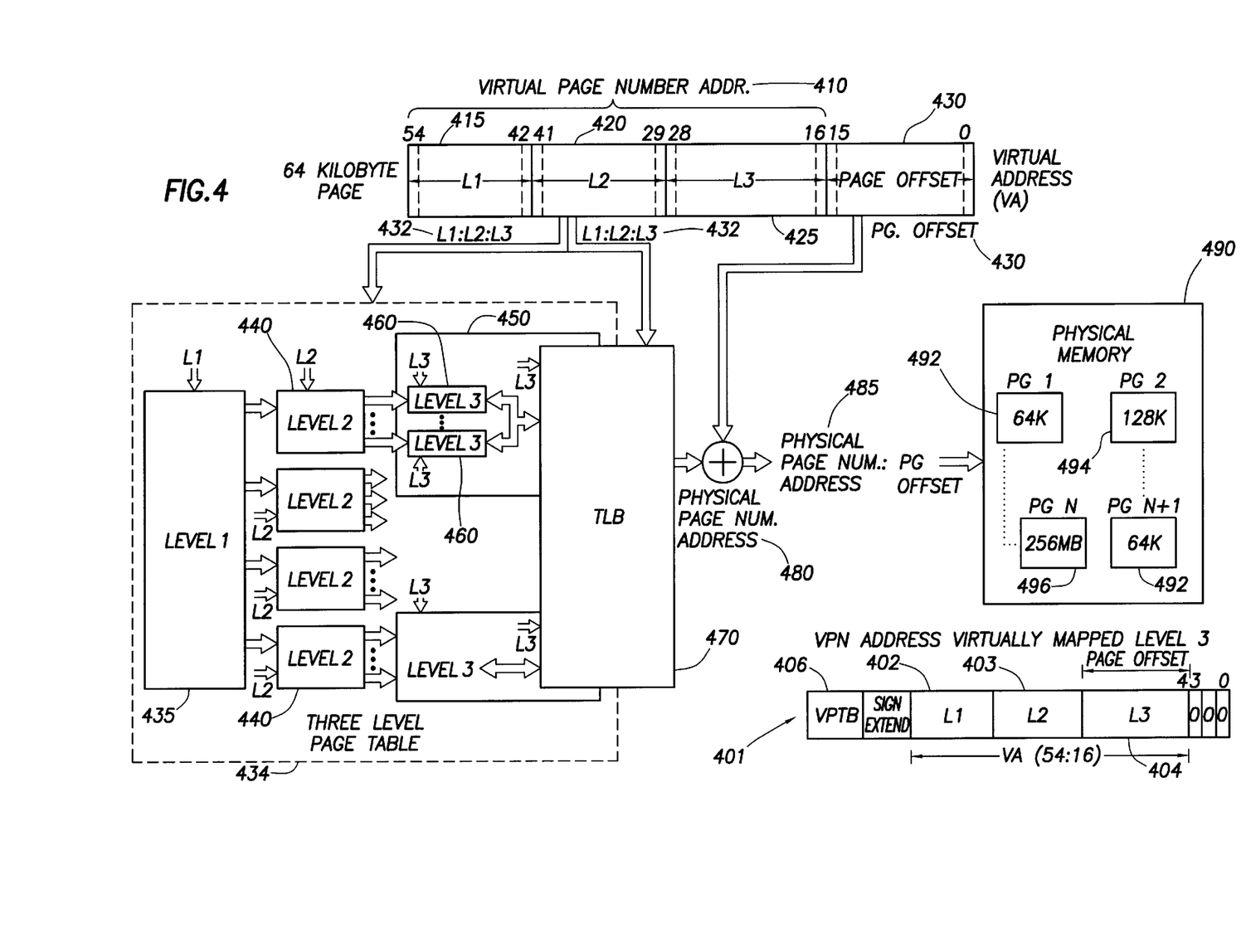
FIG. 4 shows the translation of a virtual address to a physical address using a translation lookaside buffer and multilevel page table.

Turning now to FIG. 4, in the preferred embodiment, translation of a virtual address to a physical address using a multilevel page table and translation lookaside buffer is shown for a virtual memory system supporting multiple page sizes. TLB 470 is organized such that each TLB entry contains a physical page number ("PPN") address 480 for a 64-Kilobyte physical memory page 492. Thus, larger size pages (e.g., 128-Kilobyte page 494, 256-Kilobyte page, 256-Megabyte page 496, etc.) may also be supported but with duplicate entries in the page table and other disadvantages as discussed above.

As shown in FIG. 4, a virtual address for pages of size less than 512 Megabyte can be subdivided into two subfields of bits, a VPN address field 410 and page-offset field 430. The VPN address field 410 can be further subdivided into L1 subfield 415, L2 subfield 420, and L3 subfield 425 of bits. The VPN address 410 consisting of subfields L1:L2:L3 is provided to the multilevel page table that preferably is a three level page table 434. The VPN address 410 with subfields L1:L2:L3 is also provided to the TLB 470 and is used to perform a lookup in the TLB 470 for the PPN address 480. If the VPN address 410 and corresponding PPN address 480 are not present in the TLB 470 (a TLB "miss") then a second access to the virtually mapped third level of the page table is performed. The virtually mapped third level of the page table is implemented by incorporating subfields L1 415 and L2 420 into a new VPN address 401 and using subfield L3 425 as the page offset 404. The TLB 470 thus contains physical page number addresses corresponding to both the virtual page number address 410 and the new VPN address as described above. If the second access to the TLB 470 using the new VPN address 401 described above also results in a miss (the PPN address 480 is not present in TLB 470) then a "walk" of the three level page table 434 is performed using the VPN address field 410. Level 1 435 of the three level page table 434 indexed by L1 subfield 415 selects Level 2 440 of the page table. The Level 1 page table 435 contains all possible L1 subfield values. Each entry of the Level 1 page table 435 contains an address for a particular Level 2 page table 440. After selection of a particular Level 2 page table 440 based on the L1 subfield 415, the Level 2 page table 440 is then accessed by L2 subfield 420 to select a Level 3 page table 460. Each Level 2 page table 440 contains all possible L2 subfield values 420. Each entry of a Level 2 page table 440 contains an address for a particular Level 3 page table 460. After selection of a particular Level 3 page table 460 based on the L2 subfield 420, the Level 3 page table 460 is then accessed by L3 subfield 425 to determine the physical page number address. Each Level 3 page table 460 contains a unique set of physical page number ("PPN") addresses corresponding to unique VPN addresses. In the preferred embodiment, L1 subfield 415, L2 subfield 420 and L3 subfield 425 accesses to the Level 1 435, Level 2 440, and Level 3 460 page tables occur as a sequential traversal of the page table levels. Thus, the L2 subfield 420 is provided to a Level 2 page table 440 that has been selected by the L1 subfield 415 indexing Level 1 page table 435. Similarly, the L3 subfield 425 is provided to a Level 3 page table 460 that has been selected by the L2 subfield 420 indexing the Level 2 page table. The L3 subfield 425 accessing the Level 3 page table 460 determines the PPN address 480.

Once the PPN address 480 has been selected by a walk of the three level page table using the VPN Address 410 as described above, the PPN address 480 corresponding to the VPN address 410 is placed into the TLB 470. The PPN address 480 corresponding to the VPN address 401 of the virtually mapped third level of the page table is also placed in the TLB 470. TLB 470 is again accessed with the VPN address 410 to generate the recently loaded PPN address 480 at the TLB 470 output. The physical address 485 consisting of the physical page number address:page offset (PPN address:page offset) is then used to access physical main memory 490 of the computer system. The PPN address 480 determines the particular page and the page offset 430 determines the offset within the page that the memory access is to.

Figure 5:
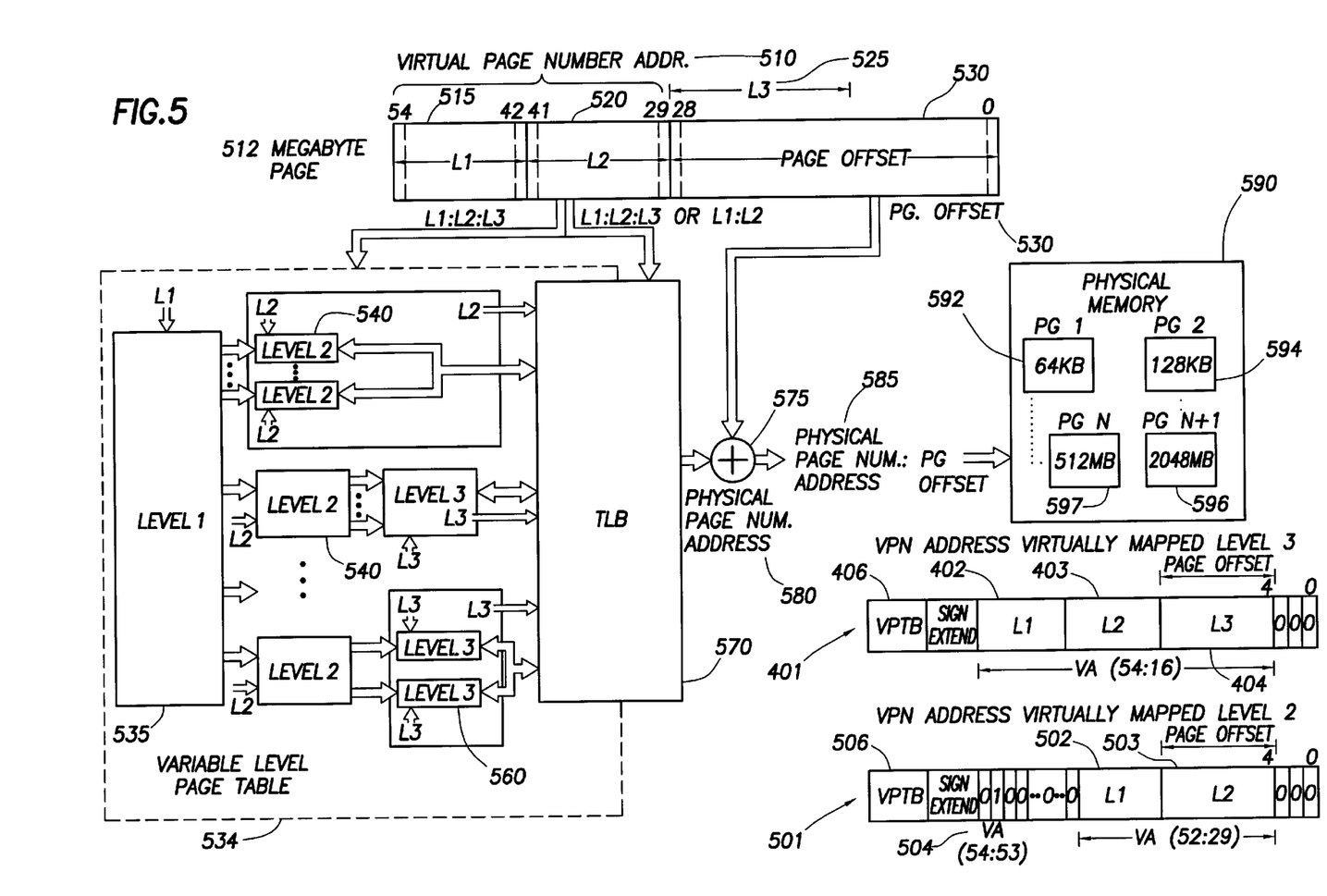
FIG. 5 shows the translation of a virtual address to a physical address using a variable level page table in which one level is eliminated for large page sizes.

FIG. 5 of the preferred embodiment shows a virtual memory system that can perform virtual-to-physical address translations using a multilevel page table for multiple size pages. The preferred embodiment effectively eliminates one or more levels of the page table for a region of the address space. For virtual memory addresses in this region of the address space, many fewer page table entries are needed to translate the same amount of memory. The minimum page size in this region of the address space is a large page size, preferably 512 Megabytes or above, that corresponds to the elimination of the page table levels. Thus, the elimination of Level 3 of the page table of FIG. 5 would correspond to a large page size of 512 megabytes. The larger the page size, the fewer pages are required to describe physical main memory and thus the corresponding number of virtual memory address bits needed to differentiate the pages decreases. In the preferred embodiment, a wide range of page sizes may be used over the entire virtual address space, but only large pages above the minimum threshold (e.g., 512 Megabytes) can be used in the region of the address space where one or more levels of the page table has been eliminated.

The preferred embodiment of FIG. 5 allows efficient virtual address translation of different size pages without the disadvantages of the multilevel page table shown in FIG. 4. The virtual address translation scheme shown in FIG. 5, unlike the scheme shown in FIG. 4, can eliminate one or more levels of the page table for a region of the virtual address space with minimum page sizes above a large page size threshold. To eliminate one or more levels of the page table for a region of the virtual address space, the preferred embodiment requires a combination of hardware and software to implement. The hardware modifies the virtual address if the memory access is to the region of the virtual address space using the larger page size. The software modifies the multilevel page table stored in physical main memory by eliminating one or more levels of the page table for the region of the virtual address space using the larger page size. The software also processes double TLB misses for the modified page table differently as described below.

Efficient virtual-to-physical translation of any size page is supported by the multilevel page table shown in FIG. 5. Preferably, TLB 570 is organized such that each TLB entry contains a physical page number ("PPN") address 580 for either a 64 Kilobyte physical memory page 592 or a 512 Megabyte physical memory page 597. Each 64 Kilobyte physical page number address entry in the TLB corresponds to a VPN address consisting of subfields L1:L2:L3 410 as shown in FIG. 4. Each 512 Megabyte physical page number address entry in the TLB corresponds to a VPN address consisting of subfields L1:L2 510 as shown in FIG. 5. Thus, the L3 subfield 525 is eliminated from the VPN address 510 for 512 Megabyte page entries in the TLB and the L3 subfield bits 525 become part of the page offset 530. In the preferred embodiment, the virtual memory system permits 512 Megabyte and larger pages preferably in only one region of virtual and corresponding physical address space. Therefore, the minimum page size in this region of address space must be 512 Megabytes. Memory intensive software applications that reference large amounts of memory can allocate virtual addresses in address space allowing 512 Megabyte pages or larger for faster memory access and reduced virtual-to-physical address translation times. Alternatively, the virtual memory system of the preferred embodiment in all other regions of virtual and corresponding physical address space includes a minimum page size of 64 Kilobytes. Thus, these regions of address space have pages of size between 64 Kilobytes and less than 512 Megabytes. Addresses in address space with a minimum page size of 64 Kilobytes use VPN address consisting of L1:L2:L3 subfield and three level page table while addresses in address space with minimum 512 Megabyte page size use VPN address consisting of L1:L2 subfield and two level page table.

As shown in FIG. 5, a virtual address for pages of size 512 Megabytes and larger can be subdivided into two subfields of bits, a VPN address field 510 and page offset field 530. The VPN address field 510 can be further subdivided into L1 subfield 515 and L2 subfield 520. The VPN address 510 consisting of subfields L1:L2 is provided to the multilevel page table 534. If the access is to pages of size less than 512 Megabytes, then the VPN address 510 consisting of subfields L1:L2:L3 is provided to multilevel page table 534. The VPN address 510 (L1:L2 or L1:L2:L3) is also provided to the TLB 570 and is used to perform a lookup in the TLB 570 for the PPN address 580. If the VPN address 510 and corresponding PPN address 580 are not present in the TLB 570 (a TLB "miss") then a second access to the virtually mapped Level 3 or Level 2 of the page table, depending on the size of the page, is performed. The virtually mapped Level 3 or Level 2 of the page table is implemented by incorporating subfield L1 502 or subfields L1 402 and L2 403, depending on the size of the page, into a new VPN address 401 or 501 and using subfield L2 503 or subfield L3 404, depending on the size of the page, as the page offset. Virtual Page Table Base ("VPTB") address field 406 or 506 is a constant set by the virtual memory system that permits the page tables to be mapped into a linear region of the virtual address space. The size of the page can quickly be determined by two upper virtual address bits 504. If these bits 504 are set to 01 then the new VPN address for the virtually mapped bottom level should be interpreted as an access to pages of size 512 Megabytes or larger. The TLB 570 thus contains physical page number addresses corresponding to both the virtual page number address 510 and the new VPN address 401 or 501 as described above. If the second access to the TLB 570 using the new VPN address 401 or 501 described above also results in a miss (the PPN address 580 is not present in TLB 570) then a "walk" of the variable level page table 534 is performed using the appropriate VPN address field (L1:L2:L3 or L1:L2) for the page size.

Level 1 535 of the variable level page table 534 indexed by L1 subfield 515 selects the appropriate Level 2 540 of the page table as the first step in a walk of the variable level page table for accesses to memory regions with less than 512 Megabyte page sizes. The Level 1 page table 535 contains all possible L1 subfield values. Each entry of the Level 1 page table 535 contains an address for a particular Level 2 page table 540. After selection of a particular Level 2 page table 540 based on the L1 subfield 515, the Level 2 page table 540 is then accessed by L2 subfield 420 to select a Level 3 page table 560. Each Level 2 page table 540 contains all possible L2 subfield values 520. Each entry of a Level 2 page table 540 contains an address for a particular Level 3 page table 560. After selection of a particular Level 3 page table 560 based on the L2 subfield 520, the Level 3 page table 560 is then accessed by L3 subfield 525 to determine the physical page number address. Each Level 3 page table 560 contains a unique set of physical page number addresses corresponding to unique L1:L2:L3 VPN addresses. In the preferred embodiment, L1 subfield 515, L2 subfield 520 and L3 subfield 525 accesses to the Level 1 535, Level 2 540, and Level 3 560 page tables occur as a sequential traversal of the page table levels. Thus, the L2 subfield 520 is provided to a Level 2 page table 540 that has been selected by the L1 subfield 515 indexing Level 1 page table 535. Similarly, the L3 subfield 525 is provided to a Level 3 page table 560 that has been selected by the L2 subfield 520 indexing the Level 2 page table. The L3 subfield 525 accessing the Level 3 page table 560 determines the PPN address 580.

For accesses to memory regions supporting page sizes greater than 512 Megabytes, the first step in a walk of the variable level page table is Level 1 535 of the variable level page table 534 indexed by L1 subfield 515 selecting the appropriate Level 2 540 of the page table. The Level 1 page table 535 contains all possible L1 subfield values. Each entry of the Level 1 page table 535 contains an address for a particular Level 2 page table 540. After selection of a particular Level 2 page table 540 based on the L1 subfield 515, the Level 2 page table 540 is then accessed by L2 subfield 420 to determine the physical page number address. Each Level 2 page table 540 contains all possible L2 subfield values 520. Each Level 2 page table 560 contains a unique set of physical page number addresses 580 corresponding to unique L1:L2 VPN addresses. Thus, unlike the Level 2 page table that support page sizes of less than 512 Megabytes and contain an address for a particular Level 3 page table, the Level 2 page tables supporting pages of 512 Megabytes and greater contain PPN addresses. For the preferred embodiment, the Level 2 page tables are loaded with either Level 3 page table addresses or PPN addresses by software during initialization of the page tables. In the preferred embodiment, L1 subfield 515 and L2 subfield 520 accesses to the Level 1 535 and Level 2 540 page tables occur as a sequential traversal of the page table levels. Thus, the L2 subfield 520 is provided to a Level 2 page table 540 that has been selected by the L1 subfield 515 indexing Level 1 page table 535. The L2 lookup of the Level 2 page table 540 then determines the PPN address 580.

Once the PPN address 580 has been selected by a walk of the variable level page table 534 using the L1:L2:L3 or L1:L2 fields as described above, the PPN address 580 corresponding to the VPN address is stored in the TLB 570. The PPN address 580 corresponding to the VPN address 401 or 501 of the virtually mapped final level of the page table is also placed in the TLB 570. TLB 570 is again accessed with the VPN address to generate the recently loaded PPN address 580 at the TLB output 580. The physical address 585 consisting of the physical page number address:page offset (PPN address:page offset) is then used to access physical main memory 590 of the computer system. The PPN address 580 determines the particular page and the page offset 530 determines the offset within the page that the memory access is to.

As mentioned above, the variable level page table permits a fixed size TLB to map much larger amounts of physical main memory. This is because duplication of TLB entries (i.e., virtual-to-physical address translations) for very large pages is tremendously reduced in the areas of memory space with minimum page size of 512 Megabytes. Since large sized pages consume many fewer duplicate entries, the number of TLB misses is greatly reduced. Furthermore, because duplication of TLB entries is reduced, duplication of pages in the data cache are also reduced and many more pages are likely to be found in the data cache. The variable level page table results in much more efficient virtual-to-physical address translation for software applications that reference a large amount of memory while still retaining the advantages of pages as small as 64 Kilobytes in size for all other software applications.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a processor including a translation lookaside buffer;
a system memory coupled to said processor and containing pages in a pre-designated space that are larger than or equal to a threshold size, said system memory containing a page table with multiple levels, said page table able to translate an original virtual address of a page of data stored in system memory into a corresponding physical address of the page of data, wherein translation of a page of data above said threshold size occurs by determining from the original virtual address whether the virtual address corresponds to a page above the threshold size and, if so, by eliminating one or more levels of said page table;
wherein said processor is capable of selectively generating a first virtual address or a second virtual address depending on whether the original virtual address corresponds to a page above the threshold size, said first and second virtual addresses corresponding to entries in said page table, and said first or second virtual addresses being used to translate said original virtual address to the physical address.

2. The computer system of claim 1 wherein eliminating one or more levels of said page table with multiple levels occurs for translation of a page of data 512 Megabytes in size or above.

3. The computer system of claim 1 wherein translation of the original virtual address of the page of data stored in system memory into the corresponding physical address of the page of data occurs only if a lookup of the translation lookaside buffer for the original virtual address of the page of data results in a miss.

4. The computer system of claim 3 wherein the page table with multiple levels does not translate the original virtual address of the page of data if the lookup of the translation lookaside buffer for the original virtual address of the final level of the page table results in a hit.

5. A computer system, comprising:
a processor including a translation lookaside buffer;
a system memory coupled to said processor and containing pages in a pre-designated space that are larger than or equal to a threshold size, said system memory containing a page table with multiple levels, said page table able to convert an original virtual address of a page of data stored in system memory into a corresponding physical address of the page of data, wherein conversion of a page of data above the threshold size occurs by determining from the original virtual address whether the virtual address corresponds to a page above the threshold size and, if so, by eliminating one or more levels of said page table; and
a disk drive coupled to said processor;
wherein said processor is capable of generating a first virtal address or a second virtual address, depending on whether the original virtual address corresponds to a page above the threshold size, said first and second virtual addresses corresponding to entries in said page table, and said first or second virtual addresses used to convert said original virtual address to the physical address.

6. A method, comprising:
by examination of first virtual address, determining whether the first virtual address corresponds to a page in memory that is of a size greater than or equal to a threshold;
if the virtual address corresponds to a page that is of a size greater than or equal to the threshold, generating a second virtual address or a third virtual address of a page table entry based on whether the size of the page exceeds the threshold as encoded in one or more bits in said first virtual address; and
translating the first virtual address to a physical address using, depending on the page size, said second or third virtual address and using a multi-level page table in which at least one level of the table is not used in the translation.

7. The method of claim 6 wherein, if the first virtual address corresponds to a page that is of a size that is less than the threshold, translating the virtual address to a physical address using all levels of the multilevel page table.

8. The computer system of claim 1 wherein said processor generates said first or second virtual address based on one or more bits in said original virtual address.

* * * * *